United States Patent [19]

Lambert et al.

[11] Patent Number: 4,960,191

[45] Date of Patent: Oct. 2, 1990

[54] PRELOADED CONTROL ARM FOR A VISCOUS FLUID CLUTCH

[75] Inventors: Harvey J. Lambert, West Milton; Lawrence C. Kennedy, Kettering, both of Ohio

[73] Assignee: General Motors Corporation, Detroit, Mich.

[21] Appl. No.: 404,536

[22] Filed: Sep. 8, 1989

[51] Int. Cl.$^5$ ............................................ F16D 35/00
[52] U.S. Cl. .................................. 192/58 B; 192/82 T
[58] Field of Search .......................... 192/58 B, 82 T; 123/41.12

[56] References Cited

U.S. PATENT DOCUMENTS 3,856,122 12/1974 Leichliter .......................... 192/58 B
4,727,969 3/1988 Hayashi et al. .................. 192/58 B

FOREIGN PATENT DOCUMENTS 58-102831 6/1983 Japan ................................ 192/58 B Primary Examiner—Richard Lorence
Attorney, Agent, or Firm—A. Michael Tucker

[57] ABSTRACT

A preload control arm for controlling fluid flow through a viscous fluid clutch includes a rotatable control shaft mounted in the clutch. The control arm is secured to the control shaft so that flexible end portions of the control arm cover pump plate orifices in the clutch. A spring secured to the control shaft provides a force adajcent the end portions opposite the pump plate orifices to maintain the seal when the control arm is in the closed position.

2 Claims, 2 Drawing Sheets

PRELOADED CONTROL ARM FOR A VISCOUS FLUID CLUTCH

BACKGROUND OF THE INVENTION

1. Field of the Invention

The present invention relates generally to a viscous fluid coupling device. In particular, the present invention is concerned with a preloaded control arm for controlling fluid flow in a viscous fluid fan clutch.

2. Statement of the Related Art

A thermostatically-controlled viscous fluid clutch assembly for driving and rotating a vehicle cooling fan is well-known. A multi-bladed fan is removably secured to a body of the clutch assembly. The fan and clutch assembly are installed between an accessory pulley of a vehicle engine (typically the water pump pulley) and a radiator. The clutch assembly drives the fan at high speeds close to input speed when cooling is required and permits the fan to rotate at low speeds when cooling is not required. Thermostatic control of the fan through the clutch assembly reduces the load on an engine and the noise caused by fan rotation, resulting in horsepower gain and improved fuel economy.

Generally, a clutch assembly includes a clutch plate having lands and grooves mated to the body having complementary lands and grooves. A pump plate separates a pair of internally-contained chambers, a collecting chamber and a pumping chamber, from a reservoir. Gates in the pump plate permit the flow of a viscous fluid from the reservoir to the collecting chamber and into a shear zone between the lands and grooves of the body and clutch plate. Fluid sheared between the lands and grooves transfers input torque from the clutch plate to drive the body and the attached fan.

Fluid flow through the pump plate gates is controlled by a control arm placed adjacent the pump plate. When cooling is not required, the control arm is rotated so that the gates are covered and the majority of the fluid in the shear zone is pumped into the pumping chamber. Orifices in the pump plate permit passage of the fluid from the pumping chamber into the reservoir. The removal of a majority of the fluid from the shear zone substantially reduces the shear between the clutch plate and the body, thereby substantially reducing the rotation of the fan.

When cooling is required, the control arm is rotated an opposite direction to uncover the gates and permit fluid to flow into the shear zone, thereby increasing the shearing force between the clutch plate and the body. This increase in input torque results in faster rotation of the fan to increase the flow of cooling air.

Oftentimes, a bimetallic element is utilized to actuate the control arm, and thus the flow of fluid through the pump plate gates. The bimetallic element may be connected to a control shaft which is in turn connected to the control arm. As the bimetallic element expands due to the temperature of warm ambient air, the shaft rotates, thereby causing the rotation of the control arm. As the ambient air cools, the bimetallic element contracts, causing the control shaft and the control arm to rotate in an opposite direction.

To accommodate manufacturing and assembly tolerances, and the expansion and contraction of a bimetallic element, the control shaft and the control arm are permitted to slide or "float" for small distances in conventional fan clutch assemblies. Such float or "end play" occurs along the longitudinal axis of the shaft. The end play of the control shaft permits greater machining and assembly tolerances, thereby reducing manufacturing costs. Furthermore, friction between the bimetallic element and a cover is reduced by the end play of the control shaft.

As the control shaft slides in a direction away from the pump plate, the attached control arm is pulled away from the pump plate and tends to wobble during rotation. When the control arm is in the closed position and pulled from the pump plate, leakage of fluid from the reservoir to the collecting chamber can occur at the gates. Unwanted fluid can continue to flow into the shear zone and create undesired high-speed rotation of the cooling fan.

The art continues to seek improvements. In current designs, it is desirable to provide tolerances for the sliding of the control shaft which connects the control arm and the bimetallic element. Concurrently, it is desirable to have an effective seal between the control arm and the pump plate when the gates are covered at all longitudinal positions of the control shaft and the attached control arm.

SUMMARY OF THE INVENTION

The present invention is directed to a viscous fluid drive device particularly suitable for a fan clutch assembly of a vehicle. The present fan clutch assembly utilizes a preloaded, rotatable control arm to cover and uncover gates in a pump plate to control fluid flow through the assembly, and thus the speed of an attached fan. A spring is mounted adjacent the control arm opposite the pump plate to urge the control arm against the pump plate and provide an effective seal when the control arm is in the closed position. The spring creates an effective seal at all longitudinal positions of a slidable control shaft connected to the control arm. The present spring is economical to manufacture and compatible with conventional fan clutch assemblies.

In a preferred embodiment, the present invention includes a preloaded control arm for controlling fluid flow through a viscous fluid clutch. A rotatable control shaft is mounted in the clutch. The control arm is secured to the control shaft so that flexible end portions of the control arm cover pump plate orifices in the clutch. A spring secured to the control shaft provides a force against the end portions opposite the pump plate orifices to maintain the seal when the control arm is in the closed position.

DETAILED DESCRIPTION OF THE PREFERRED EMBODIMENTS

Figure 1:
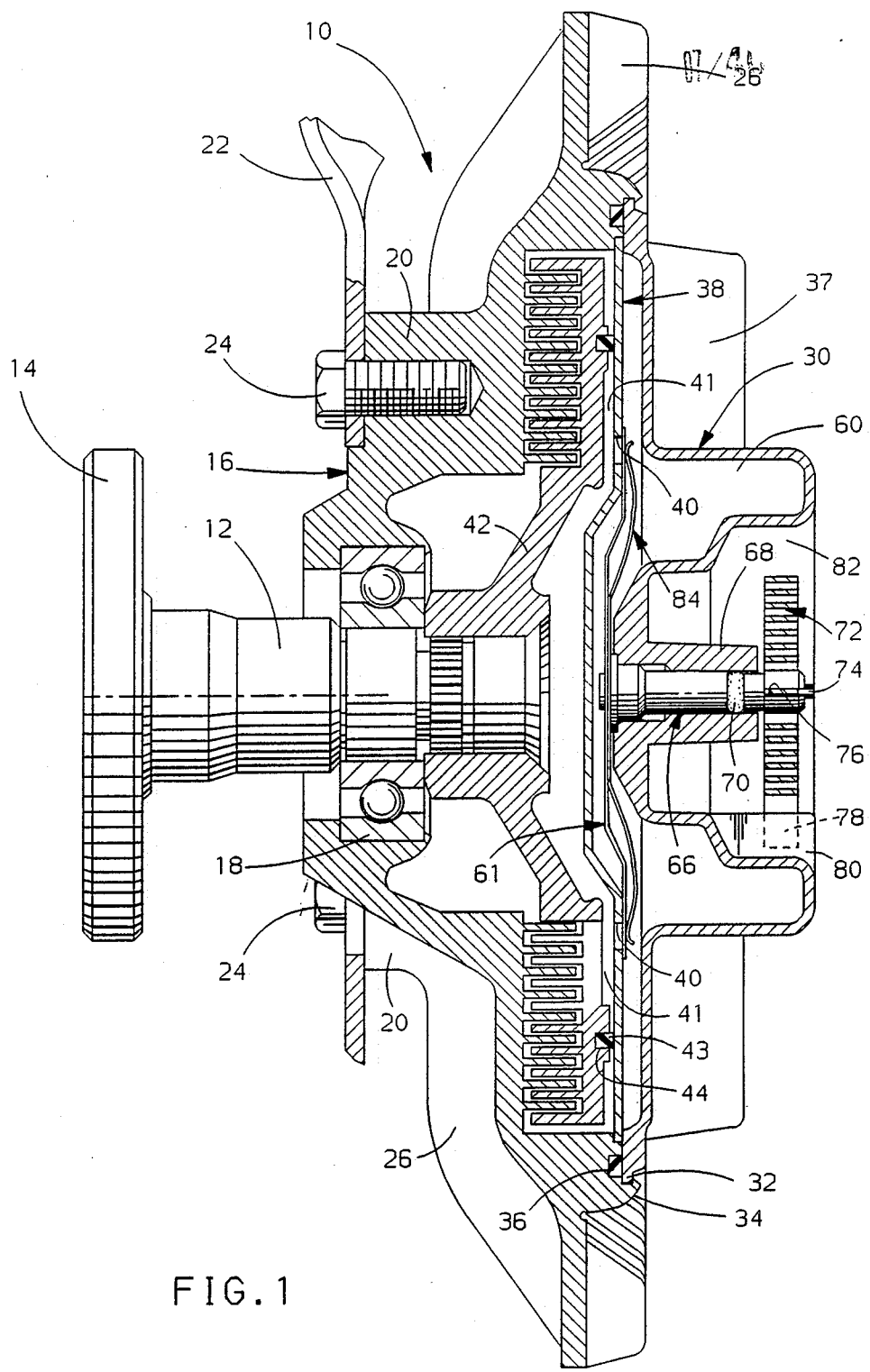
FIG. 1 is a sectional view of a viscous fluid fan clutch and blade assembly incorporating a preloaded control arm of the present invention illustrated in the closed position.

FIG. 1 illustrates a multi-bladed fan and clutch assembly, indicated generally at 10, for drawing cooling air through the core of a vehicle radiator (not illustrated) through which engine cooling fluid is circulated. The fan and clutch assembly 10 is mounted on the outboard end of a rotatably driven shaft 12 whose inboard end terminates in a flange 14 which can be secured to a conventional engine-driven water pump pulley (not illustrated). The fan and clutch assembly 10 includes a dished main body indicated generally at 16 centrally mounted for rotation on shaft 12 by a bearing 18. The main body 16 is formed with a plurality of radially extending bosses 20 to which a multi-bladed fan 22 (partially illustrated in FIG. 1) is attached by threaded fasteners 24. A plurality of fins 26 is provided on the outer surface of the main body 16 to dissipate heat transferred from a viscous fluid housed by the assembly 10.

A cover plate indicated generally at 30 is mounted to a front face of and cooperates with the main body 16 to form a housing and reservoir as described below. The cover plate 30 is a dished member whose annular outer edge 32 is secured to the main body 16 by an annular retainer lip 34 spun over from the material of the main body 16. An annular seal 36, e.g. a formed-in-place gasket, is interposed between the edge 32 and the front face of the main body 16 to prevent leakage of the fluid from the interior of assembly 10. A plurality of fins 37 is provided on the outer surface of the cover plate 30 to dissipate heat transferred from the fluid.

Disposed behind the cover plate 30 is a disk-like annular pump plate indicated generally 38 whose diameter is slightly less than that of the cover plate 30. The pump plate 38 is drivingly secured to the main body 16 as it is trapped on an annular shoulder 39 (see FIG. 2) of the main body 16 by the cover plate 30.

The pump plate 38 has a pair of diametrically opposed passages or gates 40 provided in its central portion. When uncovered, gates 40 allow the fluid to flow into a collecting chamber 41 formed and bounded by the pump plate 38, a clutch plate 42 and a divider ring 43. The clutch plate 42 is mounted (preferably splined or knurled) on shaft 12 at a central opening and provides for the hydraulic drive of the main body 16 and attached fan 22 as described below. Ring 43, preferably formed from TEFLON, is mounted in an annular groove 44 in the outer or front face of the clutch plate 42 and improves pump-out or clutch disengagement as described below.

Figure 2:
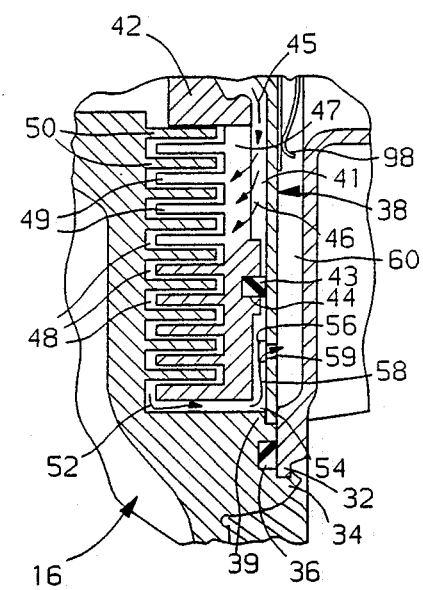
FIG. 2 is an enlarged view of a portion of the clutch assembly of FIG. 1 wherein the pump plate has been rotated to illustrate fluid flow from a pumping chamber through a pump plate orifice.
Figure 3:
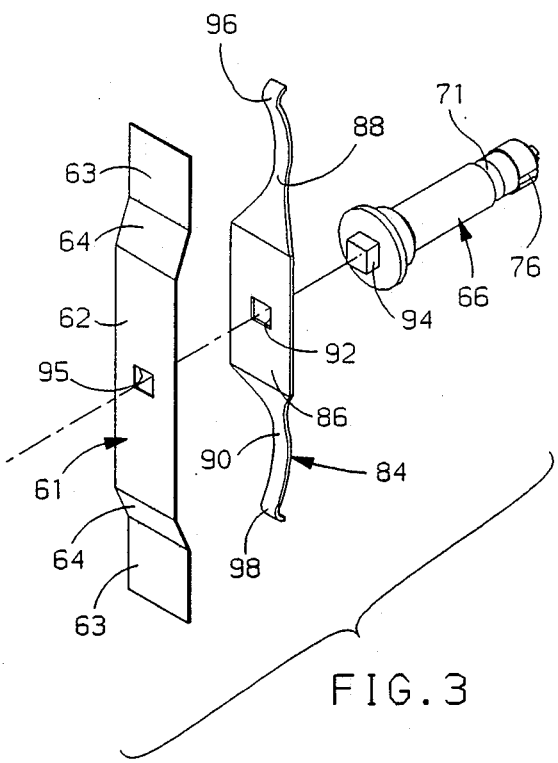
FIG. 3 is an exploded, perspective view of a control arm, a spring and a control shaft removed from the clutch assembly of FIGS. 1 and 2 for purposes of clarity of illustration.

As illustrated in FIG. 2, the centrifugal forces of the rotating assembly 10 force fluid in the collecting chamber 41 to radial fluid flow indicated at directional arrow 45. As fluid 45 reaches the lower portion of the collecting chamber 41, it is redirected to axial fluid flow indicated at directional arrows 46 through well-known passages 47 in the clutch plate 42 into an annular serpentine fluid shear zone 48 formed by the grooves or spaces between interleaved concentric annular ridges or lands 49 formed in a rear face of a clutch plate 42 and complementary concentric annular ridges or lands 50 formed on an interior surface of the main body 16.

Fluid sheared in the shear zone 48 transmits input torque from the rotatably driven clutch plate 42 to provide for the hydraulic drive of the main body 16 and the attached bladed fan 22 for cooling fan operation. Due to slippage between the clutch plate 42 and the main body 16, the fan speed is always less than the input speed from the shaft 12.

Fluid indicated at directional arrow 52 is forced radially outwardly by centrifugal forces and exits the shear zone 48 into a pumping chamber 54 formed and bounded by the pump plate 38, the clutch plate 42 and the divider ring 43.

A cylindrical projecting wiper 56 is pressed into the pump plate 38 adjacent the periphery thereof and projects into the pumping chamber 54. The wiper 56 pumps fluid indicated by directional arrow 58 from the pumping chamber 54 through a discharge orifice 59 formed in the pump plate 38 back into a fluid reservoir 60 in a manner well-known in this art. In other embodiments, the wiper 56 can have other shapes or can be formed separately from the pump plate 38 and secured to it by any suitable means.

The reservoir 60 formed between the cover plate 30 and the pump plate 38 contains a specified quantity of viscous fluid. The covering and uncovering of the gates 40 to control the supply of the fluid into the collecting chamber 41 is provided by a control arm indicated generally at 61. In the embodiment illustrated, the control arm 61 is a flexible longitudinal dished member having a planar central portion 62 and opposite planar wings 63 connected by a ramp wall 64 to form a profile complementary to the pump plate 38. The control arm 61 is drivingly connected to a control shaft indicated generally at 66 as described below. The control shaft 66 is rotatably mounted in a tubular hub portion 68 formed in the central portion of the cover plate 30. An O-ring seal 70 is mounted in an annular groove 71 in the control shaft 66 and makes peripheral contact with the inner wall of the hub portion 68 to prevent fluid leakage to the exterior of the assembly 10.

Figure 4:
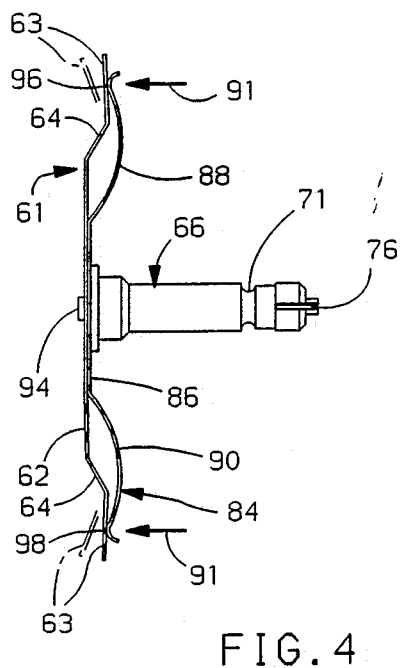
FIG. 4 is an assembled, side view of the control arm, spring and control shaft of FIG. 3.
Figure 5:
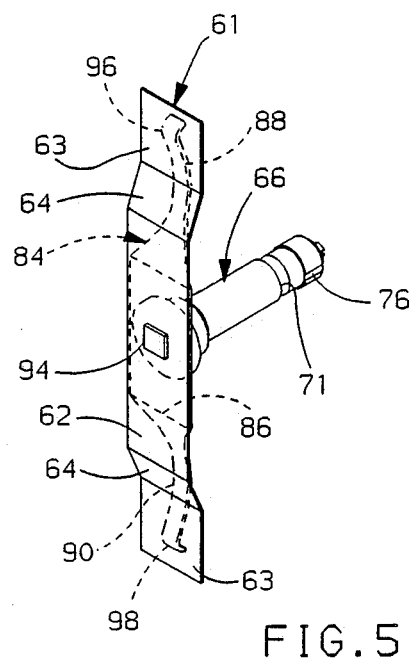
FIG. 5 is an assembled, perspective view of the control arm, spring and control shaft of FIGS. 3 and 4.

A helically-wound bimetallic thermostatic valve control element indicated generally at 72 (FIG. 1) includes an inner end portion 74 mounted in a transverse slot 76 (illustrated best in FIGS. 4 and 5) formed in a forward end of the control shaft 66 and an outer end portion 78 mounted in a retaining tab 80 formed in the cover plate 30. Preferably, the valve control element 72 is recessed within a cavity 82 surrounding the hub portion 68. Through this construction, an increase or decrease in ambient air temperature causes the winding or unwinding of the valve control element 72, resulting in rotation of the control shaft 66 and the attached control arm 61. The control arm 61 is illustrated in the closed position in FIGS. 1 and 2 wherein the wings 63 cover the gates 40. When the valve control element 72 expands due to heat, the control shaft 66 and the control arm 61 rotate in one direction so that the wings 63 uncover the gates 40 in a well-known manner in this art. When the valve control element 72 contracts due to cooling, the control shaft 66 and the control arm 61 rotate the opposite direction so that the wings 63 cover the gates 40.

A spring indicated generally at 84 is mounted adjacent the control arm 61 to apply pressure to a rear surface of the control arm 61. Preferably, the spring 84 is a flexible longitudinal member constructed from steel or other suitable material. In the embodiment illustrated in the figures, the spring 84 includes a central, substantially planar portion 86 and opposite arcuate portions 88 and 90. The planar 86 portion is placed against the front surface of the central portion 62 of the control arm 61, while the arcuate portions 88 and 90 provide a spring force represented by directional arrows 91 (FIG. 4) against the wings 63. An opening 92 in the planar portion 86 receives a mounting stud 94 provided on the rearward end of the control shaft 66. The mounting stud 94 is also inserted in a central opening 95 in the central portion 62 of the control arm 61. The mounting stud 94 is spun over to fixedly retain both the control arm 61 and the spring 84. When the control shaft 66 is rotated by the winding or unwinding of the bimetallic valve control element 72, both the control arm 61 and the spring 84 rotate in the same direction. In other embodiments, any suitable means, e.g. riveting, can be used to retain the control arm 61 and the spring 84 to the control shaft 66.

The thickness of the spring 84 must be small enough so that it fits between the control arm 61 and the cover 30 as illustrated in FIGS. 1 and 2. Furthermore, the radius of each arcuate portion 88 and 90 is limited by the clearance between the control arm 61 and the cover 30. Preferably the width of the planar portion 86 is substantially equal to the width of the control arm 61.

Each arcuate portion 88 and 90 is bent away from the control arm 61 and terminates in a respective contact area 96 and 98. If desired, the contact areas 96 an 98 can be curled away from the control arm 61 as illustrated in the figures. Preferably, the width of each arcuate portion 88 and 90 is less than the width of the planar portion 86 to reduce the weight of the spring 86 and reduce the area of the contact areas 96 and 98. The length and radius of each arcuate portion 88 and 90 are such that each contact area 96 and 98 is directly opposite a respective gate 40 in the pump plate 38 when the control arm 61 is in the closed position. The force 91 provided by each contact area 96 and 98 maintains the seal by the wings 63 at the gates 40 during all longitudinal positions of the control arm 61 and control shaft 66 as they slide in the hub portion 68 along the longitudinal axis of the control shaft 66 in response to the winding and unwinding of the bimetallic valve control element 72 as described above. The wings 63 must be flexible and capable of bending (as illustrated in phantom in FIG. 4) in response to the spring force 91 applied by the contact areas 96 and 80 so that the seal is effective between the wings 63 and the gates 40.

When the control arm 61 is rotated by the control shaft 66 to the open position, the reduced area of each contact area 96 and 98 applies only minimum drag against the pump plate 38, thereby minimizing any hysteresis effect of the spring 84 on the flow of fluid through the assembly 10.

It is understood that various profiles and shapes of the present spring 84 are within the scope of the present invention. Furthermore, the present spring 84 can be incorporated in fan clutches which activate the control arm 61 by means other than a bimetallic valve control element 72. For example, an electromagnetic assembly can be used to rotate the control arm 61 and the spring 84.

Although the present invention has been described with reference to a preferred embodiment, workers skilled in the art will recognize that changes may be made in form and detail without departing from the spirit and scope of the invention.

The embodiments of the invention in which an exclusive property or privilege is claimed are defined as follows:

1. An assembly for controlling the flow of fluid in a viscous fluid clutch to vary the speed of an attached fan, wherein the clutch includes a pump plate for separating a fluid reservoir from a shear zone, and a plurality of orifices in the pump plate, the assembly comprising:
    (a) a rotatable control shaft mounted in the clutch;
    (b) means for selectively rotating the control shaft connected to the shaft;
    (c) a rotatable control arm having a central planar portion drivingly connected to the control shaft and flexible planar end portions slidable against the pump plate to selectively cover the pump plate orifices upon rotation of the control shaft to prevent fluid flow through the orifices; and
    (d) rotatable spring means having a central planar portion drivingly connected to the control shaft and flexible arcuate portions terminating in reduced-width contact areas placed in contact with the control arm end portions directly opposite the pump plate orifices for maintaining a seal at the orifices by the flexible control arm end portions when the control arm is rotated so that the control arm end portions cover the orifices.

2. A preloaded control arm assembly for controlling the flow of fluid from a reservoir through a pair of diametrically opposed pump plate orifices to a shear zone in a viscous fluid clutch, the control arm assembly comprising:
    (a) a rotatable control shaft mounted in the clutch;
    (b) a rotatable control arm having a central planar portion drivingly connected to the control shaft and opposite flexible wing portions slidable against the pump plate to selectively cover the pump plate orifices upon rotation of the control shaft to prevent fluid flow through the orifices;
    (c) rotatable spring means having a central planar portion drivingly connected to the control shaft and flexible arcuate portions terminating in reduced-width contact areas placed in contact with the control arm wing portions directly opposite the pump plate orifices for maintaining a seal at the orifices by the control arm wing portions when the control arm is rotated so that the control arm wing portions cover the orifices; and
    (d) means for selectively rotating the control shaft.

* * * * *